(12) United States Patent
Kim et al.

(10) Patent No.: US 9,063,302 B2
(45) Date of Patent: Jun. 23, 2015

(54) OPTICAL CONNECTOR AND OPTICAL DEVICE HAVING THE SAME

(75) Inventors: Do Won Kim, Daejeon (KR); Gyungock Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 265 days.

(21) Appl. No.: 13/443,843

(22) Filed: Apr. 10, 2012

(65) Prior Publication Data

US 2012/0263411 A1 Oct. 18, 2012

(30) Foreign Application Priority Data

Apr. 18, 2011 (KR) .................. 10-2011-0035736

(51) Int. Cl.
  *G02B 6/36* (2006.01)
  *G02B 6/38* (2006.01)
  *G02B 6/42* (2006.01)
  *G02B 6/12* (2006.01)

(52) U.S. Cl.
  CPC ............. *G02B 6/3897* (2013.01); *G02B 6/423* (2013.01); *G02B 6/4249* (2013.01); *G02B 6/4292* (2013.01); *G02B 2006/12107* (2013.01)

(58) Field of Classification Search
  USPC .......................................... 385/89
  See application file for complete search history.

(56) References Cited

U.S. PATENT DOCUMENTS

| 5,620,634 A | * | 4/1997 | Shahid ...................... 264/1.25 |
| 7,162,124 B1 | | 1/2007 | Gunn, III et al. |
| 7,366,380 B1 | * | 4/2008 | Peterson et al. ................ 385/47 |

FOREIGN PATENT DOCUMENTS

KR 10-2005-0097694 A 10/2005

OTHER PUBLICATIONS

Alexander W. Fang et al., "A distributed feedback silicon evanescent laser", OPTICS EXPRESS, Mar. 31, 2008, pp. 4413-4419, vol. 16 No. 7, Optical Society of America.
Cary Gunn, PHD, "Fully Integrated VLSI CMOS and Photonics CMOS Photonics", Symposium on VLSI Technology Digest of Technical Papers, 2007, pp. 6-9.

* cited by examiner

*Primary Examiner* — Mike Stahl
*Assistant Examiner* — Kajli Prince

(57) ABSTRACT

Provided are an optical connector capable of improving optical alignment efficiency and an optical device having the same. The connector may include a body having a top surface and a bottom surface facing each other, through holes penetrating the body to connect the top and bottom surfaces, and alignment keys provided on at least side surface of the body to be parallel to the through holes.

9 Claims, 10 Drawing Sheets

OPTICAL CONNECTOR AND OPTICAL DEVICE HAVING THE SAME

CROSS-REFERENCE TO RELATED APPLICATIONS

This U.S. non-provisional patent application claims priority under 35 U.S.C. §119 to Korean Patent Application Nos. 10-2011-0035736, filed on Apr. 18, 2011, in the Korean Intellectual Property Office, the entire contents of which are hereby incorporated by reference.

BACKGROUND OF THE INVENTION

Embodiments of the inventive concepts relate to an optical device, and more particularly, to an optical connector and an optical device having the same.

Optical communication technologies will offer the possibility to satisfy various technical requirements for realizing an IT-oriented society, in that it can transfer fast large capacity data. The silicon photonics technology, one of them, can realize a two-way optical communication system. In the silicon photonics technology, it is hard to fabricate monolithically light emitting devices in conjunction with other optoelectronics devices, owing to several limitations of silicon in material properties. As a result, silicon photonics technology requires an optical connector for connecting the light emitting device with an external optical device. However, in the case of the conventional optical connector, there are difficulties, such as low alignment efficiency and low connection reliability, in a connection with an optoelectronic chip.

SUMMARY

Embodiments of the inventive concepts provide an optical connector capable of improving optical alignment efficiency and an optical device having the same.

According to example embodiments of the inventive concepts, an optical connector may include a body having a top surface and a bottom surface facing each other, through holes penetrating the body to connect the top and bottom surfaces, and alignment keys provided on at least side surface of the body to be parallel to the through holes.

In example embodiments, the alignment keys may include "V"-shaped grooves, whose longitudinal axes may be parallel to the through holes.

In example embodiments, the body may be shaped like a hexahedral block.

In example embodiments, the alignment keys may include first alignment keys provided on first and second side surfaces of the body facing each other and second alignment keys provided on third side surfaces connecting the first side surface to the second side surface.

In example embodiments, the connector may further include a holder provided on the body and a guide portion connecting the holder to the body.

In example embodiments, the body may further include guide pin holes provided in an internal portion of the body to be parallel to the through holes.

According to example embodiments of the inventive concepts, an optical device may include optical fibers, an optoelectronic chip including a substrate, optical waveguides formed on the substrate along a first direction, and optical couplers enabling the optical fibers to be optically coupled to the optical waveguides, and an optical connector including a body having a top surface and a bottom surface facing each other, through holes penetrating the body to connect the top and bottom surfaces, and alignment keys provided on at least side surface of the body to be parallel to the through holes.

In example embodiments, the optical waveguides may include a ridge-type linear waveguide formed on the substrate.

In example embodiments, the optoelectronic chip may further include a clay covering the optical waveguides on the substrate.

In example embodiments, the clad may include a silicon oxide layer.

In example embodiments, the optoelectronic chip may further include coupler lines provided on the substrate to extend along a second direction crossing the first direction.

In example embodiments, the optical couplers may be disposed at intersections between the coupler lines and the optical waveguides, respectively.

In example embodiments, the optical couplers may include a grating coupler.

In example embodiments, the body may be shaped like a hexahedral block. In example embodiments, the alignment keys include first alignment keys provided on first and second side surfaces of the body facing each other and second alignment keys provided on third side surfaces connecting the first side surface to the second side surface.

In example embodiments, the first alignment keys may be aligned to the optical waveguides along the first direction in a one-to-one manner, and the second alignment keys may be aligned to the coupler lines along the second direction.

In example embodiments, the optical fibers may be coupled to the optical waveguides at an inclined angle ranging from about 80° to about 90° with respect to the first direction.

BRIEF DESCRIPTION OF THE DRAWINGS

Example embodiments will be more clearly understood from the following brief description taken in conjunction with the accompanying drawings. FIGS. 1 through 11 represent non-limiting, example embodiments as described herein.

FIG. 1 is a perspective view illustrating an optical device according to an example embodiment of the inventive concept;

FIG. 2 is a perspective view illustrating the optical connector and the optical fiber of FIG. 1;

FIG. 3 is a front view of FIG. 2;

FIG. 4 is a side view of FIG. 2;

FIG. 6 is a flowchart illustrating a method of aligning an optical device, according to example embodiments of the inventive concept;

FIG. 7 is a front view illustrating an example of alignment between the first alignment keys and the optical waveguide;

FIG. 8 is a side view illustrating an example of alignment between the second alignment keys and the coupler lines;

FIG. 9 is a perspective view illustrating an optical device according to other embodiment of the inventive concept; and FIGS. 10 and 11 are perspective views illustrating the optical connector of FIG. 9.

Figure 1:
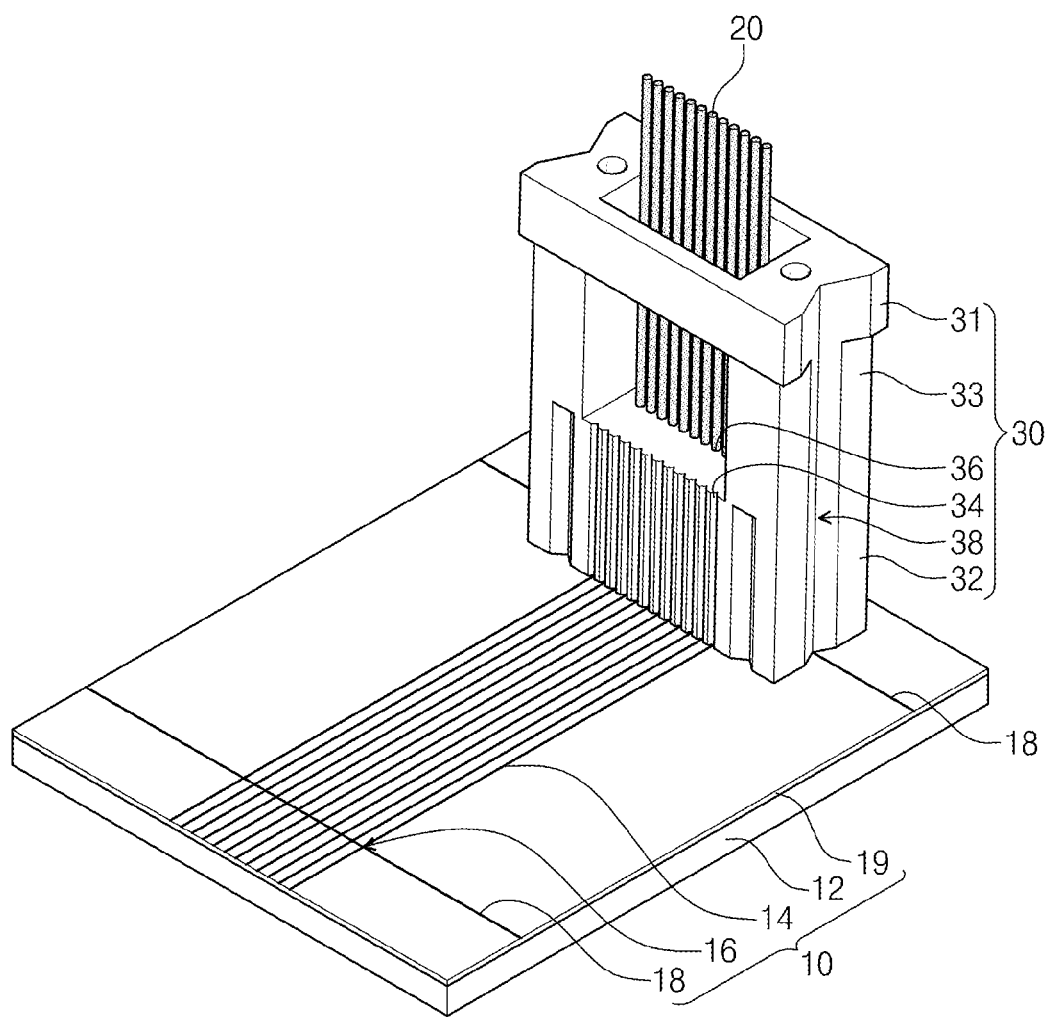

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating an optical device according to an example embodiment of the inventive concept.

Referring to FIG. 1, an optical device according to example embodiments of the inventive concept may include an optical connector 30 having first alignment keys 34, which may be aligned to optical waveguides 14 of an optoelectronic chip 10. The optical connector 30 may include a body 32 having a plurality of through holes 36, and optical fibers 20 may be disposed to pass through the through holes 36. The first alignment keys 34 may be disposed on a first side surface (or a front surface) and/or a second side surface (or a rear surface) of the body 32. For example, the first and second side surfaces may be opposite sidewalls, respectively, of the optical connector 30 intersecting with the optical waveguides 14 of the optoelectronic chip 10. The optical connector 30 may further include second alignment keys 38, which are formed on third side surfaces of the body 32 and are parallel to the first alignment keys 34. The second alignment keys 38 may be aligned to coupler lines 18 of the optoelectronic chip 10. The third side surfaces may be opposite sidewalls of the optical connector 30 intersecting with the coupler lines 18 of the optoelectronic chip 10. The coupler lines 18 may be provided to cross orthogonally the optical waveguides 14 at optical couplers 16. The first alignment keys 34 and the second alignment keys 38 of the optical connector 30 may be aligned to the optical waveguides 14 and the coupler lines 18 of the optoelectronic chip 10, respectively. The optical fibers 20 may be easily aligned to the optical waveguides 14.

Accordingly, efficiency in optical alignment and reliability in optical coupling can be improved in the optical device according to the example embodiment of the inventive concept.

Figure 2:
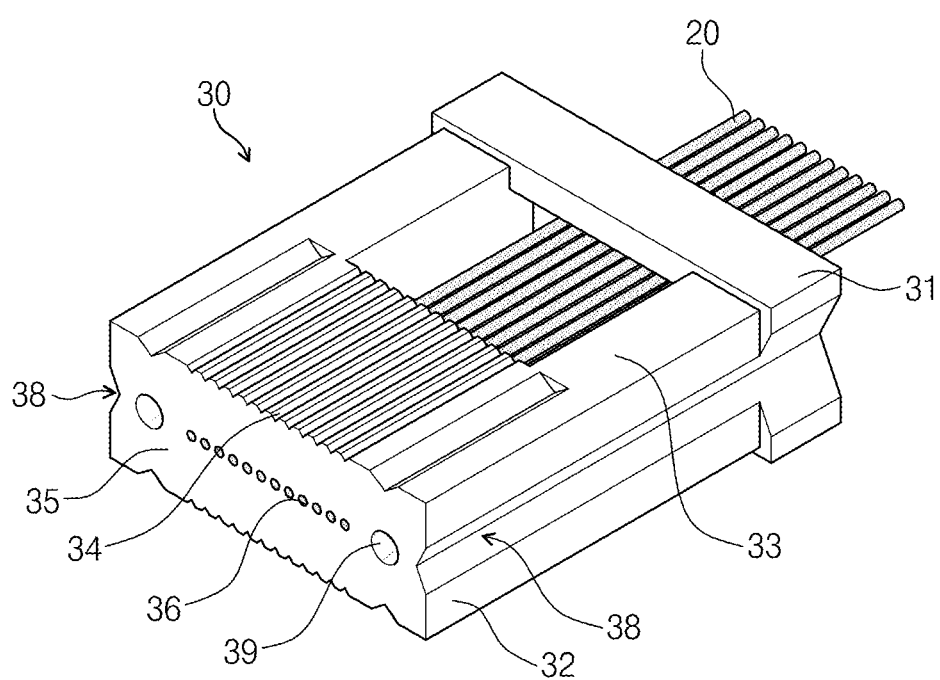
Figure 3:
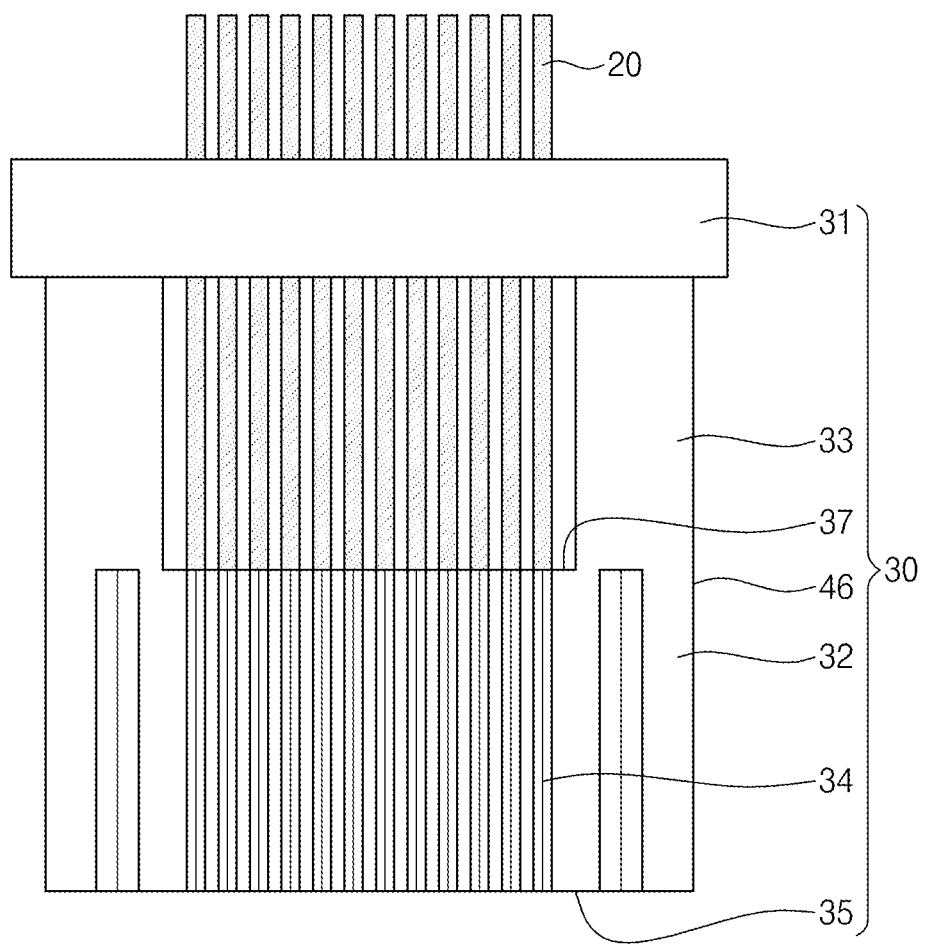
Figure 4:
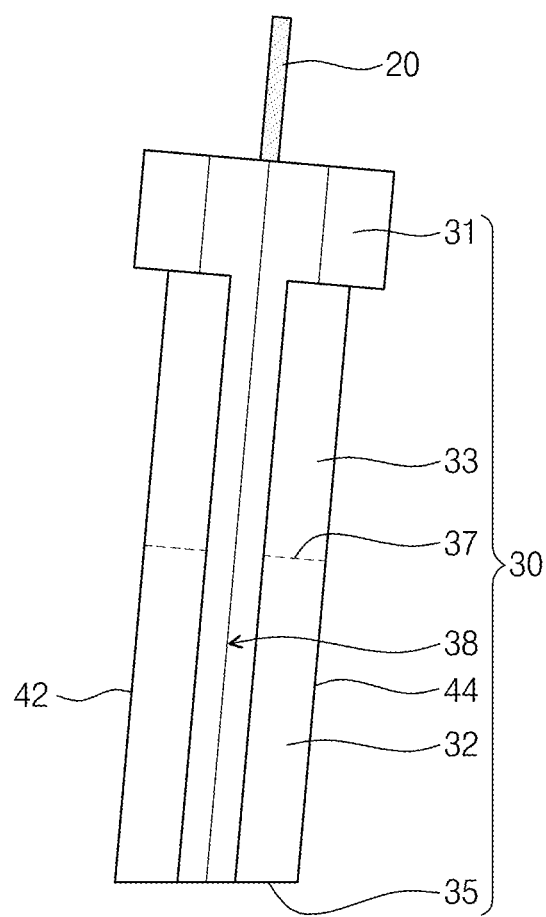

FIG. 2 is a perspective view illustrating the optical connector and the optical fiber of FIG. 1. FIG. 3 is a front view of FIG. 2 and FIG. 4 is a side view of FIG. 2.

Referring to FIGS. 1 through 4, the optical connector 30 may include the body 32, a holder 31, and a guide portion 33. The body 32 may be configured to fasten the optical fibers 20 and have a bottom surface 35 coupled to the optoelectronic chip 10. The holder 31 may be provided on the body 32 to surround the optical fibers 20. The guide portion 33 may be configured to connect the holder 31 with the body 32. The body 32 may include a ferrule fastening the optical fibers 20. The body 32 may be shaped like a hexahedral block. The bottom surface 35 may be shaped like a rectangle. The body 32 may include a plurality of the through holes 36, which allow the optical fibers 20 to pass through from a top surface 37 of the body 32 to the bottom surface 35 of the body 32. The through holes 36 may be perpendicular or slanted to the bottom surface 35 of the body 32. The body 32 may include guide pin holes 39 parallel to the through holes 36. The guide pin holes 39 may extend from the guide portion 33 to the holder 31. The guide pin holes 39 may have a diameter greater than the through holes 36. Although not depicted, the guide pin holes 39 may allow a guide pin to pass therethrough. The guide pin may be used to fasten other optical connector to be connected to the holder 31.

The first alignment keys 34 and the second alignment keys 38 may be configured to have "V"-shaped grooves, which are formed on surfaces of the optical connector 30 adjacent to the bottom surface 35. The V-shaped grooves may be formed parallel to the through holes 39. The first alignment keys 34 may be formed on a first side surface 42 and/or a second side surface 44 of the body 32. The first and second side surface 42 and 44 of the body 32 may have boundaries at long sides of the bottom surface 35. The through holes 36 may be formed between the first alignment keys 34. The first alignment keys 34 may be disposed spaced apart from each other in the first and second side surfaces. The first direction may be oriented from the first side surface 42 to the second side surface 44. In example embodiments, if the number of the through holes 36 or the optical fibers 20 is 12, the number of the first alignment keys 34 may be 24.

The first alignment keys 34 may be formed to have the substantially same line width as the optical fibers 20. From a front side view of the optical connector 30, the first alignment keys 34 may be formed to have centers coincident with those of the through holes 36 and the optical fibers 20. Each of the optical fibers 20 may include a core (not shown), in which a light is transferred, and a cladding (not shown) covering the core. The first alignment keys 34 may be aligned to the core of the optical fibers 20 in the first direction.

The second alignment keys 38 may be formed on both sidewalls of the body 32. The through holes 36 and the optical fibers 20 inserted into the through holes 36 may be disposed between the second alignment keys 38. The through holes 36 may be disposed by the equal spacing in a second direction perpendicular to the first direction. The second direction may be defined to be parallel to the long side of the bottom surface 35. On the bottom surface 35, the second alignment keys 38 may be spaced apart from each other in the second direction. In example embodiments, the number of the second alignment keys 38 provided in the body 32 may be 2. The second alignment keys 38 may extend to the guide portion 33 and the holder 31 beyond the body 32. From a side view of the second alignment keys 38, the through holes 36 and the optical fibers 20 may be overlapped with each other. The second alignment keys 38 may have a line width greater than the optical fiber 20. The second alignment keys 38 and the through holes 36 may be formed to have centers coincident with each other. The guide pin holes 39 and the through holes 36 may be disposed between the second alignment keys 38 to be parallel to each other in the second direction.

Figure 5A:
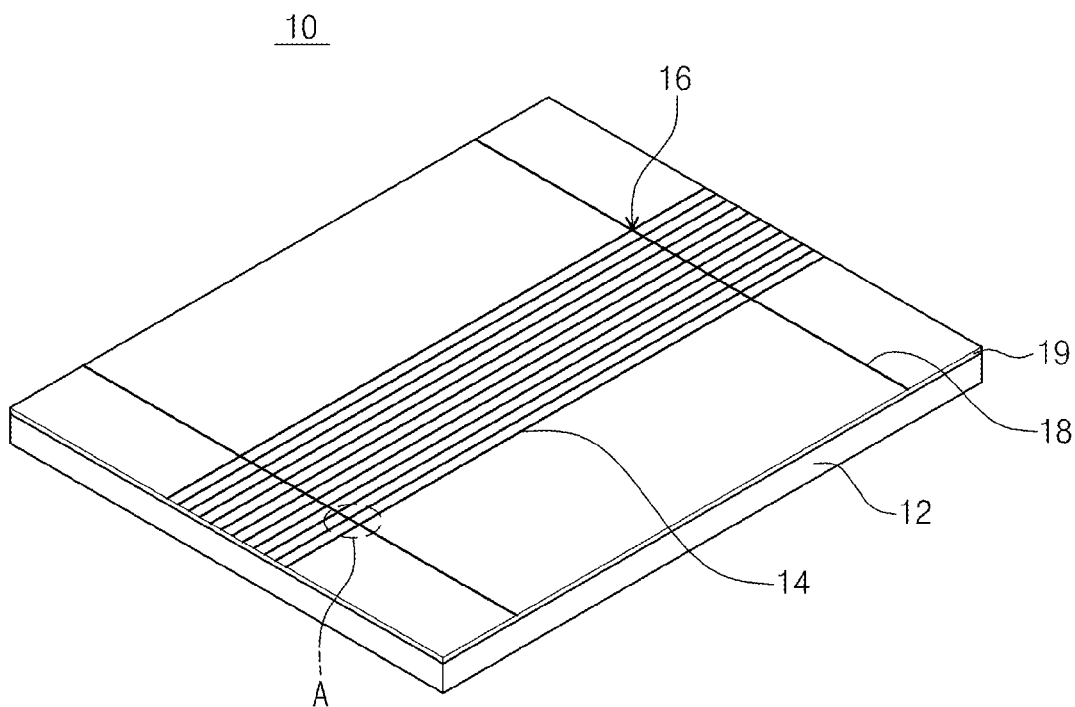
FIG. 5A is a perspective view of the optoelectronic chip of FIG. 1.
Figure 5B:
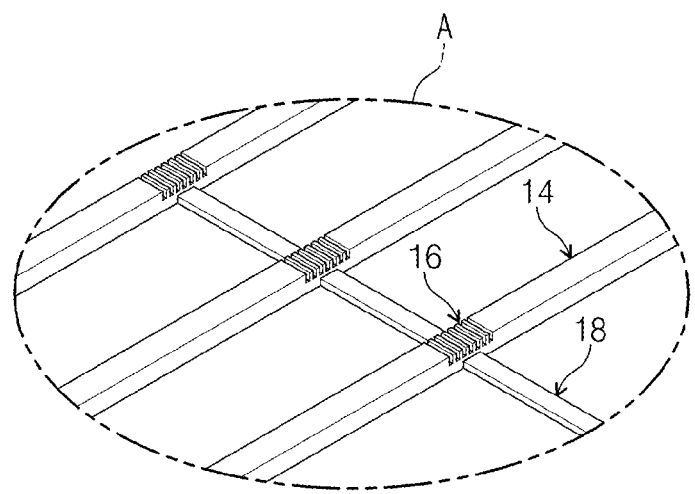
FIG. 5B is a expanded view of A of FIG. 5A

FIG. 5A is a perspective view of the optoelectronic chip of FIG. 1. FIG. 5B is a expanded view of A of FIG. 5A.

Referring to FIGS. 5A and 5B, the optoelectronic chip 10 may include a substrate 12, the optical waveguides 14 extending along the first direction on the substrate 12, the optical couplers 16 formed on the optical waveguides 14, and the coupler lines 18 connecting the optical couplers 16 along the second direction. The substrate 12 may be a flat-type element, such as a single crystalline silicon wafer, a silicon-on-insulator (SOI) wafer, or a glass substrate. The optical waveguides 14 may be configured to transfer optical signals receiving from or emitting to the outside via optical fibers 22. In example embodiments, the optical waveguides 14 may serve as first reference alignment keys. The optical waveguides 14 may include ridge-type linear waveguide provided on the substrate 12. The first reference alignment keys may be disposed on the substrate 12 to extend along the first direction. Although not shown, the first reference alignment keys may be formed to have a longitudinal direction different from those of optical waveguides 14. A clad 19 may be formed to cover the optical waveguides 14 on the substrate 12. In example embodiments, the clad 19 may be formed to have a flat top surface. The optical waveguides 14 may include a material having refractive index higher than the clad 19 and for example, include a single-crystalline silicon layer. In example embodiments, the clad 19 may include a transparent silicon oxide layer.

Each of the optical couplers 16 may include a grating coupler. The grating coupler may be formed to include a plurality of grooves, which may be formed on the optical waveguides 14 to have a linear, mesh, or curved shape. The optical couplers 16 may be disposed at intersections between the optical waveguides 14 and the coupler lines 18. The coupler lines 18 may be provided below the optical waveguides 14 but on the substrate 12. In example embodiments, the coupler lines 18 may be configured to have the substantially same a refractive index as the optical waveguides 14. The coupler lines 18 may serve as a second reference alignment provided along the second direction, on the substrate 12.

Although not shown, the optoelectronic chip 10 may include at least one of monolithically integrated devices, such as diode, sensor, semiconductor photoamplifier, optical modulator, multiplexer, and de-multiplexer. The monolithically integrated devices may be connected to the optical waveguides 14 on the substrate 12.

Figure 6:
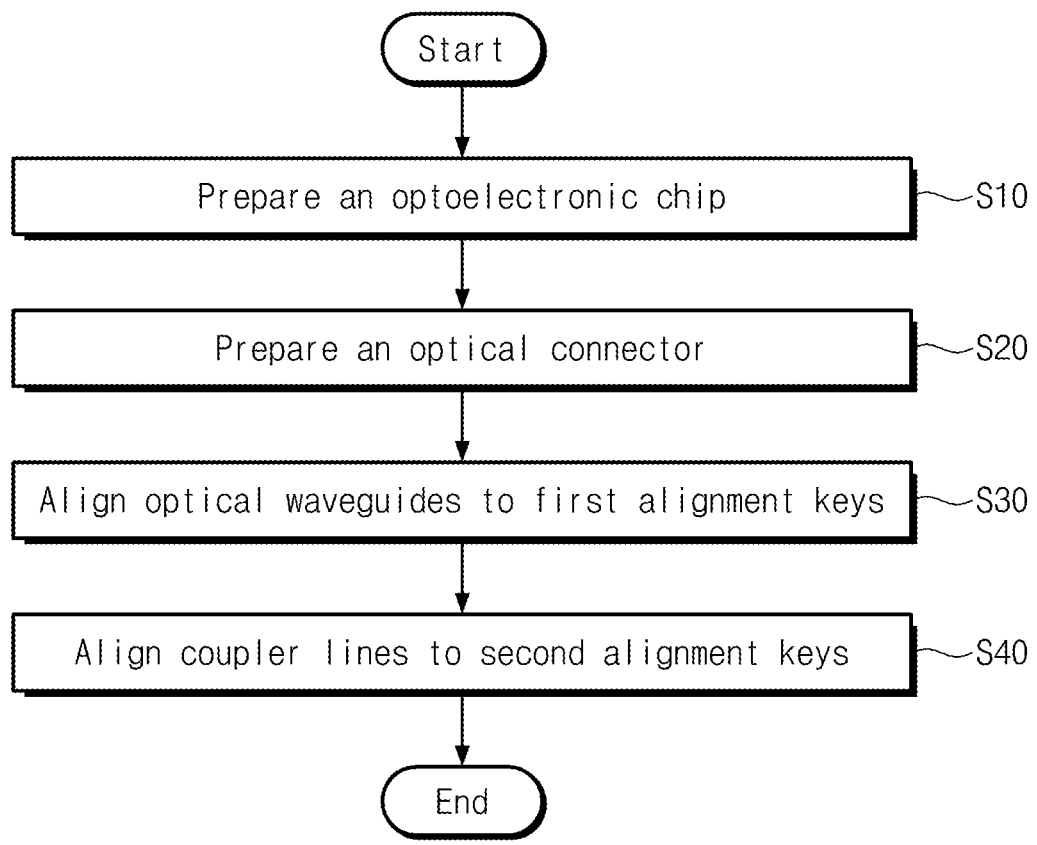
Figure 7:
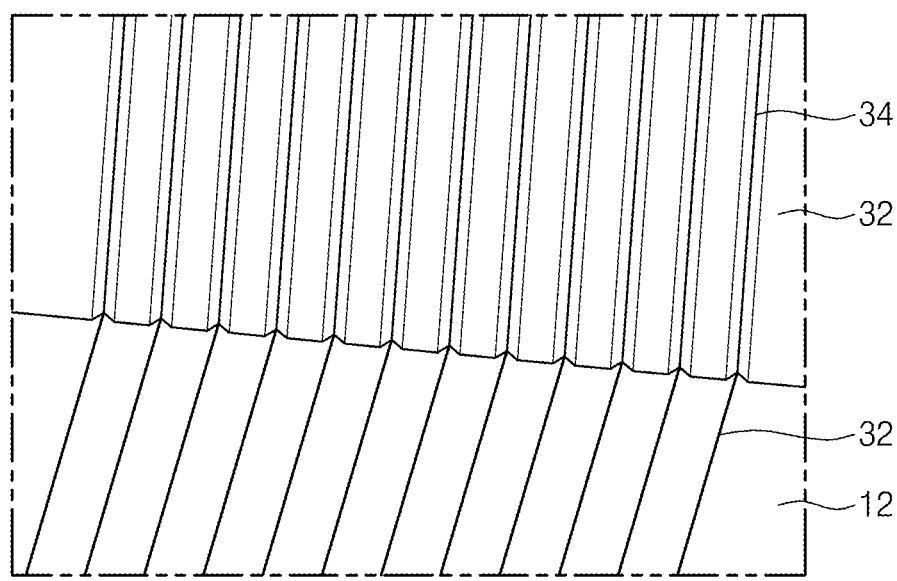
Figure 8:
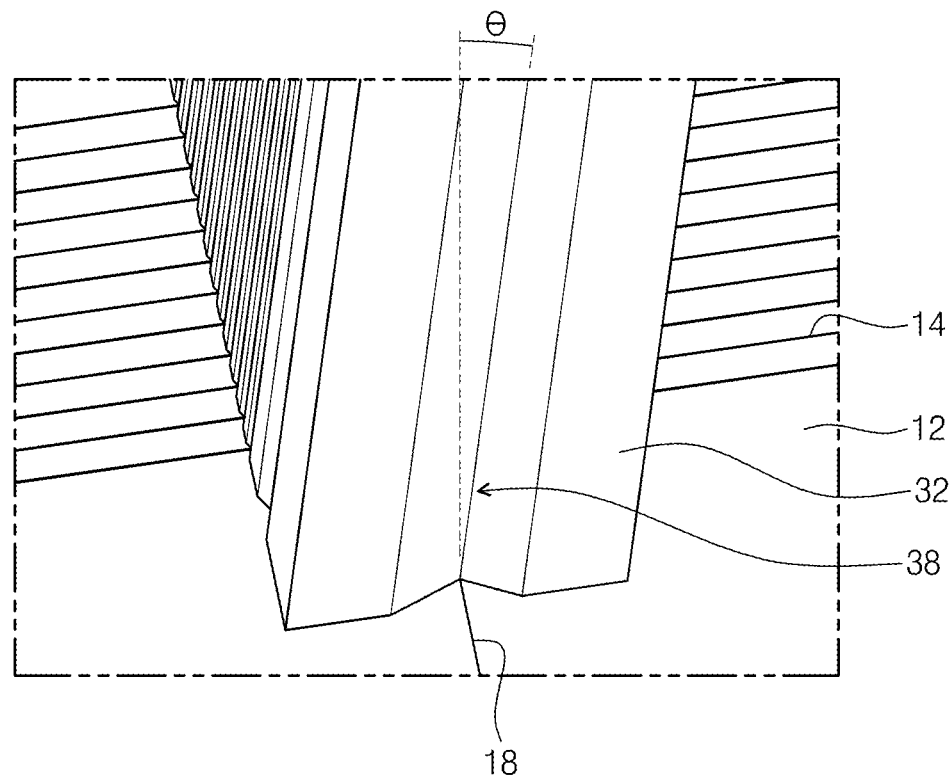

FIG. 6 is a flowchart illustrating a method of aligning an optical device, according to example embodiments of the inventive concept. FIG. 7 is a front view illustrating an example of alignment between the first alignment keys and the optical waveguide. FIG. 8 is a side view illustrating an example of alignment between the second alignment keys and the coupler lines.

Referring to FIGS. 6 through 8, a method of aligning an optical device, according to example embodiments of the inventive concept may include preparing the optoelectronic chip 10 and the optical connector 30, respectively, (in S10 and S20), aligning the optical waveguides 14 to the first alignment keys 34 (in S30), and aligning the coupler lines 18 to the second alignment keys 38 (in S40).

The optoelectronic chip 10 and the optical connector 30 may include the optical waveguides 14 and the first alignment keys 34, respectively, which may have longitudinal axes parallel to the first direction. The optoelectronic chip 10 and the optical connector 30 may include the coupler lines 18 and the second alignment keys 38, respectively, which may have longitudinal axes parallel to the second direction. The optical connector 30 may be disposed on the substrate 12 of the optoelectronic chip 10. The first alignment keys 34 and the second alignment keys 38 of the optical connector 30 may be sequentially aligned to the optical waveguides 14 and the coupler line 18 of the optoelectronic chip 10.

For example, the optical connector 30 may be aligned to the optoelectronic chip 10 using a high resolution microscope (not shown). For example, the first alignment keys 34 may be aligned to the optical waveguides 14 of the optoelectronic chip 10 in the first direction in a one-to-one manner, and then, the second alignment keys 38 may be aligned to the coupler line 18 of the optoelectronic chip 10 in the second direction.

The first alignment keys 34 may have a line width greater than the optical waveguides 14. The optical waveguides 14 may be aligned to centers of the first alignment keys 34. From a front view of the optical connector 30, the first alignment keys 34 may extend along the first direction with respect to the optical waveguides 14.

Similarly, the second alignment keys 38 may have a line width greater than the coupler line 18. The coupler line 18 may be aligned to centers of the second alignment keys 38. From a side view of the optical connector 30, the second alignment keys 38 may be tilted with respect to the coupler line 18.

The optical connector 30 may be coupled on the optoelectronic chip 10 to be tilted at a predetermined angle. The optical fibers 20 may be configured to minimize reflection loss, when an incident light is incident onto the optical couplers 16 slantingly at a given angle. For example, the optical fibers 20 may be disposed to haven an incident angle θ ranging from about 0° to about 10° with respect to the optical waveguides 14 and the optical couplers 16. In other words, the optical fibers 20 may be coupled on the optical coupler 16 of the substrate 12 at an inclined angle ranging from about 80° to about 90°.

Although not shown, the optical fibers 20 and the optical couplers 16 may be aligned using the optical connector 30 having the first alignment keys 34 and the second alignment keys 38 and then be optically aligned using an optical power meter, which can measure a contact point loss between the optical waveguides 14 and the optical fibers 20. The optical connector 30 may be fixed to the optoelectronic chip 10 using adhesives and/or glue. The adhesives and glue may include epoxies.

Accordingly, efficiency in optical alignment and reliability in optical coupling can be improved in the optical device according to the example embodiment of the inventive concept.

Figure 9:
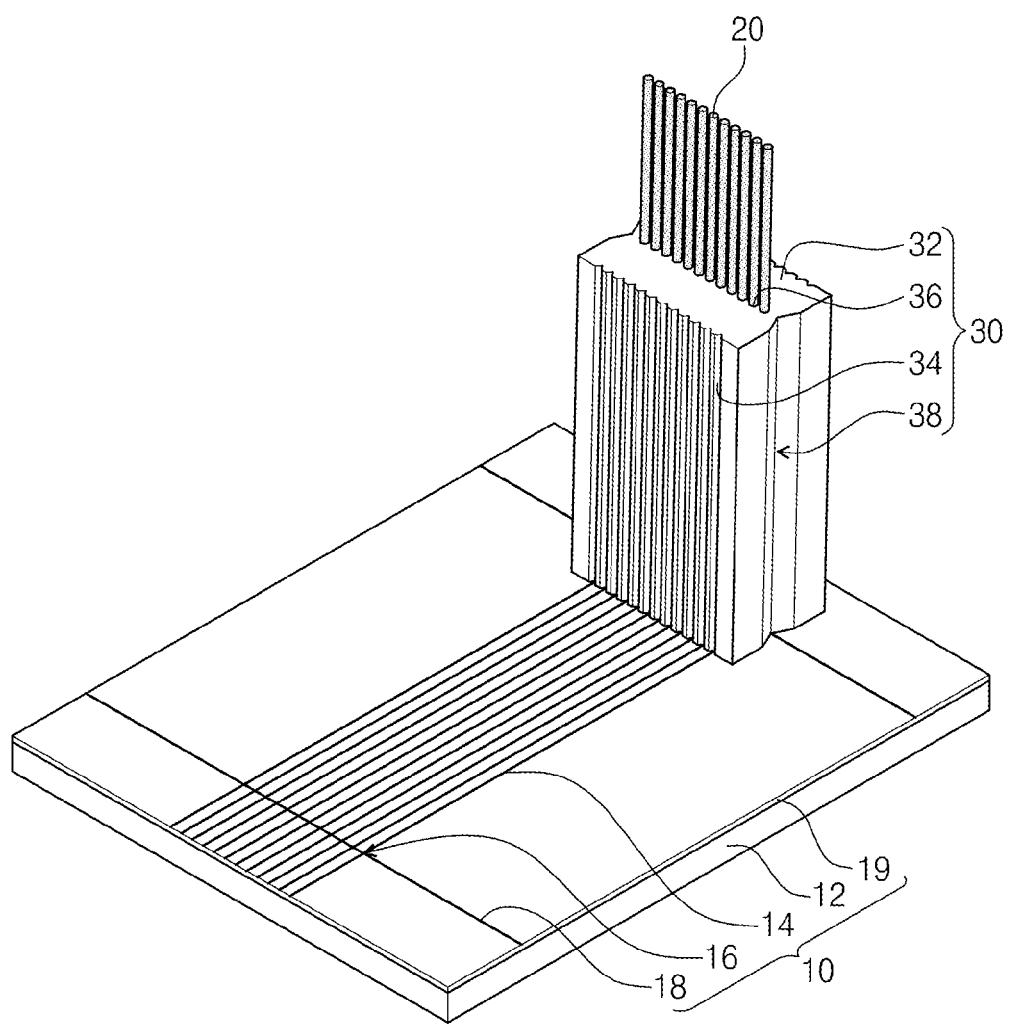
Figure 10:
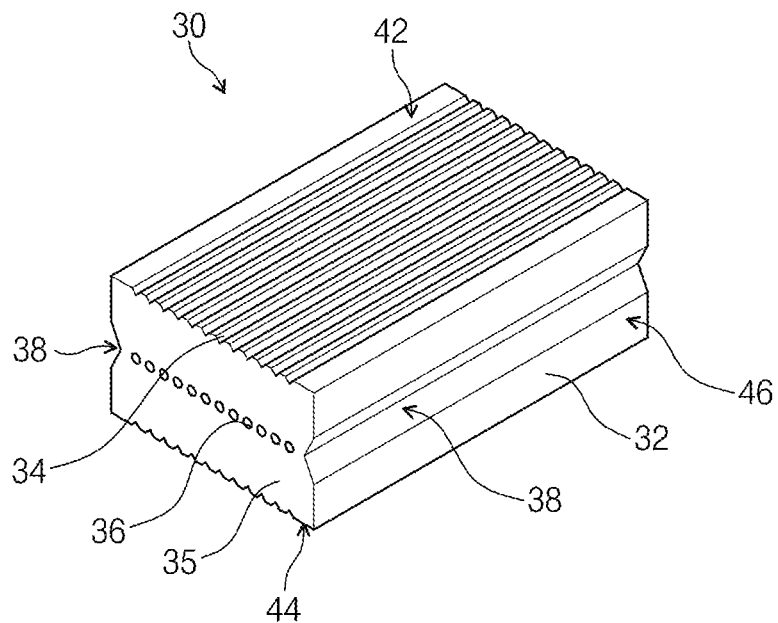
Figure 11:
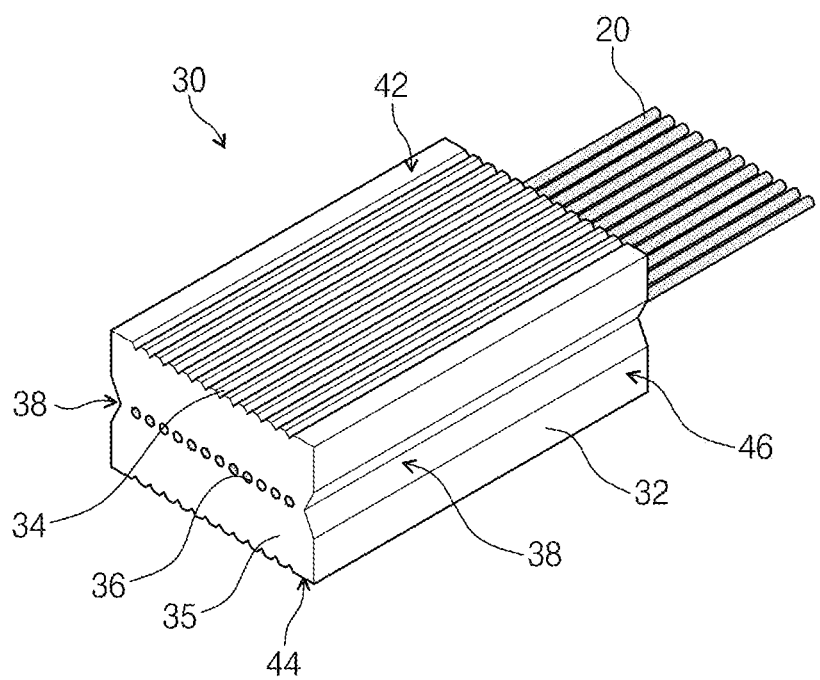

FIG. 9 is a perspective view illustrating an optical device according to other embodiment of the inventive concept. FIGS. 10 and 11 are perspective views illustrating the optical connector of FIG. 9.

Referring to FIGS. 9 through 11, an optical device according to other embodiment of the inventive concept may include the optical connector 30 having the body 32, which is coupled to the optoelectronic chip 10 and is shaped like a hexahedral block. The body 32 may be configured not to have the guide pin holes, and thus the optical connector 30 can have a reduced size compared with that of the embodiments previously described with reference to FIGS. 1 through 8. The optical fibers 20 may be inserted into the through holes 36 formed in the body 32 of the optical connector 30. The through holes 36 may extend form the bottom surface 35 toward an internal region of the body 32. The bottom surface 35 may expose cutting surfaces of the optical fibers 20 inserted into the through holes 36 of the body 32.

The optical connector 30 may include the first alignment keys 34 and the second alignment keys 38 formed in the body 32. The first alignment keys 34 may be formed on the first side surface 42 and/or the second side surface 44 of the body 32. The second alignment keys 38 may be formed on the third side surfaces 46 positioned at both sides of the body 32.

The optoelectronic chip 10 may include the optical waveguides 14 extending along the first direction on the substrate 12 and the coupler lines 18 extending along the second direction to cross the optical waveguides 14. The optical couplers 16 may be disposed at intersections between the optical waveguides 14 and the coupler lines 18, respectively. The optical waveguides 14 may serve as first reference alignment keys to be matched with the first alignment keys 34, when the optoelectronic chip 10 may be coupled with the optical connector 30. The first reference alignment keys may be disposed on the substrate 12 to extend along the first direction. The first reference alignment keys may be formed to have a longitudinal direction different from those of curved optical waveguides 14. The coupler lines 18 may serve as second reference alignment keys to be matched with the second alignment keys 38. The optical fibers 20 and the optical couplers 16 may be easily aligned with each other using the optical connector 30 with the first alignment keys 34 and the second alignment keys 38.

Accordingly, efficiency in optical alignment and reliability in optical coupling can be improved in the optical device according to the other embodiment of the inventive concept.

According to example embodiments of the inventive concept, an optical connector may include first alignment keys and second alignment keys, which may be formed on outer surfaces of a body and be aligned to optical waveguides and coupler lines, respectively, of an optoelectronic chip. The coupler lines may extend along a direction connecting optical couplers provided on the optical waveguides. The optical connector may be configured to fix optical fibers by the body; for example, the optical fibers may be disposed in contact holes of the body, which may be formed parallel to the first and second alignment keys. The optical fibers may be optically connected to the optical waveguides via the optical couplers. Accordingly, facilitation and efficiency in optical alignment process can be improved in the optical devices according to the afore-described embodiments of the inventive concept.

While example embodiments of the inventive concepts have been particularly shown and described, it will be understood by one of ordinary skill in the art that variations in form and detail may be made therein without departing from the spirit and scope of the attached claims.

What is claimed is:

1. An optical device, comprising:
    optical fibers;
    an optoelectronic chip including a substrate, optical waveguides formed on the substrate along a first direction, optical couplers enabling the optical fibers to be optically coupled to the optical waveguides, and coupler lines provided on the substrate to extend along a second direction crossing the first direction; and
    an optical connector including a body having a top surface and a bottom surface facing each other, through holes penetrating the body to connect the top and bottom surfaces, and alignment keys provided on at least a side surface of the body to be parallel to the through holes, the alignment keys including:
  first alignment keys provided on first and second side surfaces of the body facing each other and aligned to the optical waveguides along the first direction in a one-to-one manner; and
  second alignment keys provided on third side surfaces connecting the first side surface to the second side surface and aligned to the coupler lines along the second direction.

2. The device of claim 1, wherein the optical waveguides comprise a ridge-type linear waveguide formed on the substrate.

3. The device of claim 1, wherein the optoelectronic chip further comprises a clad covering the optical waveguides on the substrate.

4. The device of claim 3, wherein the clad comprises a silicon oxide layer.

5. The device of claim 1, wherein the optical couplers are disposed at intersections between the coupler lines and the optical waveguides, respectively.

6. The device of claim 5, wherein each optical coupler comprises a grating coupler.

7. The device of claim 5, wherein the body is shaped like a hexahedral block.

8. The device of claim 1, wherein the optical fibers are coupled to the optical waveguides at an inclined angle ranging from about 80° to about 90° with respect to the first direction.

9. An optical device, comprising:
  optical fibers;
  an optoelectronic chip including a substrate, optical waveguides formed on the substrate along a first direction, optical couplers enabling the optical fibers to be optically coupled to the optical waveguides, and coupler lines provided on the substrate to extend along a second direction crossing the first direction; and
  an optical connector including:
    a body having a top surface and a bottom surface facing each other;
    through holes penetrating the body to connect the top and bottom surfaces;
    first alignment keys aligned to the optical waveguides along the first direction in a one-to-one manner; and
    second alignment keys aligned to the coupler lines along the second direction.

* * * * *